F. L. STUART.
APPARATUS FOR CONVEYING AND DELIVERING MATERIAL.
APPLICATION FILED APR. 30, 1919.
1,317,997.
Patented Oct. 7, 1919.
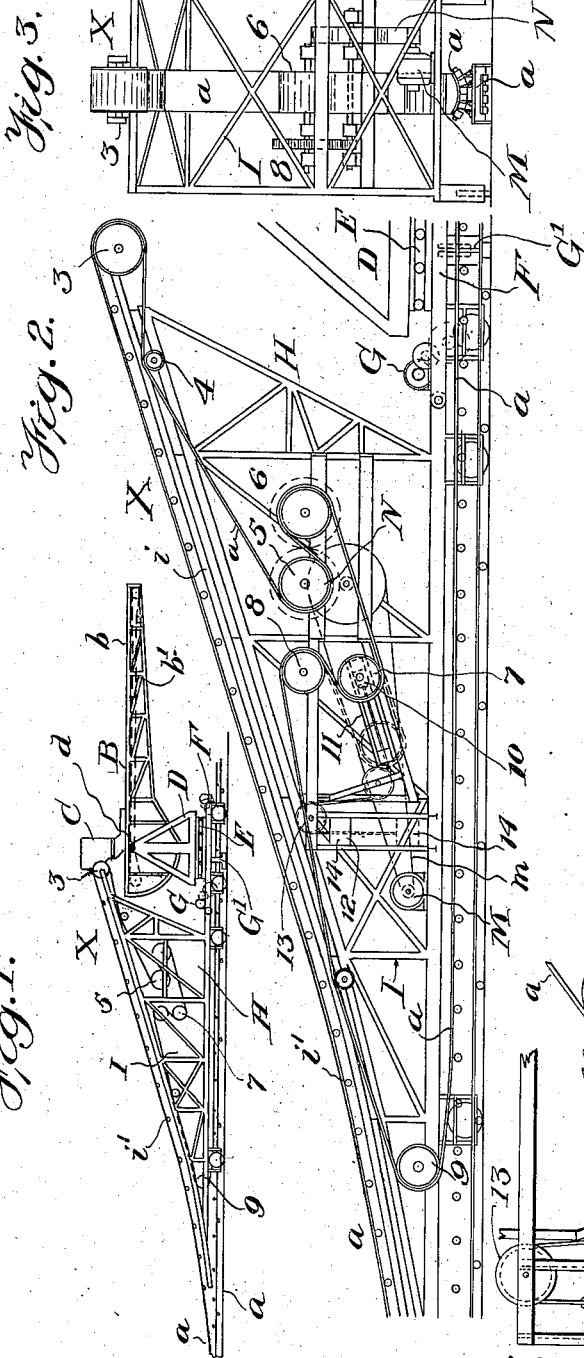
INVENTOR
Francis Lee Stuart.
BY HIS ATTORNEYS

UNITED STATES PATENT OFFICE.

FRANCIS LEE STUART, OF NEW YORK, N. Y., ASSIGNOR TO INTERNATIONAL CONVEYOR CORPORATION, OF NEW YORK, N. Y.

APPARATUS FOR CONVEYING AND DELIVERING MATERIAL.

1,317,997.

Specification of Letters Patent.

Patented Oct. 7, 1919.

Application filed April 30, 1919. Serial No. 293,674.

*To all whom it may concern:*

Be it known that I, FRANCIS LEE STUART, a citizen of the United States, residing in New York city, in the county of New York and State of New York, have invented certain new and useful Improvements in Apparatus for Conveying and Delivering Material, of which the following is a specification.

This invention relates to conveyers of the class in which an endless conveyer belt, usually of great length, is employed to carry material from a distant source of supply to a point of delivery where it is transferred from the main conveyer belt to a delivery apparatus, usually in the form of a trimmer or stacker, comprising a boom conveyer having various adjustments and which receives material from the main conveyer belt by means of a tripper or loop formed in the main conveyer belt. The main conveyer belt in this class of conveyers has heretofore ordinarily been driven by mechanism applied to one end or a terminal of the belt at a point far distant from the delivery apparatus.

According to my invention, I provide means on the delivery apparatus for operating the main conveyer belt which is so arranged that it applies a pulling force directly to the tripper portion of the belt. It is driven by motor mechanism mounted on the delivery apparatus which delivery apparatus also carries means for taking up any slack that may occur in the belt and apply tension thereto.

In the accompanying drawings:—

Figure 1 is a side elevation of a delivery conveyer made in accordance with my invention associated with a main conveyer belt.

Fig. 2 is a view on an enlarged scale and in side elevation, showing more in detail the mechanism carried by the delivery apparatus.

Fig. 3 is an end elevation thereof.

Fig. 4 is a diagram showing how the main conveyer belt is supported and indicating also how it is driven.

Fig. 5 is a detail view showing the devices for taking up slack in the belt and for applying tension thereto.

The main conveyer belt *a* enters the delivery apparatus at 1 (Fig. 4,), forms a loop or tripper 2 by passing over what is termed in this art a head or delivery pulley 3, thence passes back over a bend pulley 4, is then reeved through driving pulleys 5 and 6, then back to take-up pulleys 7 and 8, thence over a bend pulley 9 and then forward, in the manner indicated by the arrow.

Fig. 4 also illustrates by dotted lines how the loop or tripper X may be shifted from one position on the belt to another so as to deliver from the belt in various vertical planes.

Referring now to Figs. 1 and 2, the delivery apparatus proper is indicated at B and comprises a boom *b* having a delivery belt *b'* which receives material from a hopper C to which the tripper X delivers. The boom is mounted on a frame D to turn about a horizontal axis *d* and said frame is supported on a turntable E carried by a truck F. The truck is propelled over the main conveyer belt by motor mechanism G, mounted on the truck. G' indicates a brake on the truck which may be used to hold it in place after it has been moved to the desired position for delivering material. The truck has an extension or trailer H which is coupled to the truck D and really forms a part of said truck and may be so considered. The extension H is provided with a frame I which supports the tripper, the guide pulleys, tension pulleys, etc. which are shown most clearly in Fig. 2. The frame has an inclined portion *i* equipped with rollers *i'* over which the main conveyer belt *a* passes upward and forward to the discharge pulley 3. Thence the belt passes over the bend pulley 4 directly to the drive pulleys 5 and 6 to which power is applied from a motor M, supported on the truck, the motor being connected by a belt *m* to a transmission pulley N, geared to the driving pulleys. In this way a pulling force is applied to the tripper portion of the main conveyer belt immediately after it has formed the loop and after it has discharged its load to the delivery apparatus. Heretofore, as before stated, the driving mechanism has been applied to the end or terminal of the endless belt which is far distant from the tripper and far distant from the load carried by the belt, whereas in my improved apparatus power for moving the belt, as before stated, is applied directly to the tripper portion of the belt near its point of delivery.

After passing from the drive pulleys 5 and 6, the belt a is reeved through tension pulleys 7 and 8, the pulley 7 being carried by blocks 10, sliding in a guide frame 11. These blocks are connected to a rope or cable 12, passing over a pulley 13, and carrying a weight 14. In this way a constant tension is applied to the belt and slack portions therein are prevented.

Fig. 2 shows the tension pulley 7 in two positions, and the counterweight 14 is also shown in two positions.

After passing through the tension pulleys the belt passes over bend pulleys and guide pulleys in the manner before described and as indicated diagrammatically in Fig. 4.

The apparatus above described not only has the advantages before mentioned but it has the advantage of being self-contained, i. e., the apparatus for moving the main conveyer belt and applying tension thereto is mounted on the same truck that carries the delivery apparatus, said delivery apparatus being actuated by mechanism to give it the necessary adjustments which is carried by said truck, and in this way an attendant can control the operation of all the mechanism concerned in the conveying and the delivery of the material.

I claim as my invention:—

1. Apparatus for conveying and delivering material, comprising an endless main conveyer belt provided with a looped portion or tripper, a delivery conveyer which receives material from the tripper, a truck on which said delivery conveyer and said tripper are supported, a motor on said truck and driving connections from the motor which engage the tripper portion of the belt below the delivery end thereof.

2. Apparatus for conveying and delivering material, comprising an endless main conveyer belt provided with a looped portion or tripper, a delivery conveyer which receives material from the tripper, a truck on which said delivery conveyer and said tripper are supported, a motor on said truck, driving pulleys on the truck through which the tripper portion of the belt is reeved, driving connections between the motor and said driving pulleys, and means on the truck engaging the belt adjacent said driving pulleys for maintaining a uniform tension on said belt.

3. Apparatus for conveying and delivering material, comprising an endless main conveyer belt provided with a looped portion or tripper, a boom conveyer which receives material from the tripper, a truck on which said boom conveyer and said tripper are supported, means on the truck for propelling it longitudinally over the main conveyer belt, a motor on said truck, driving connections from the motor which engage the tripper below the delivery end thereof, and means on the truck engaging the belt for maintaining a tension thereon.

4. Apparatus for conveying and delivering material, comprising an endless main conveyer belt provided with a looped portion or tripper, a truck on which said delivery conveyer and said tripper are supported, means on the truck for propelling it longitudinally over the main conveyer belt, a motor on said truck, driving connections from the motor which engage the tripper portion of the belt below the delivery end thereof for driving said main conveyer belt, and means on the truck for holding said truck in any desired position.

In testimony whereof I have hereunto subscribed my name.

FRANCIS LEE STUART.